United States Patent [19]

Masuo

[11] 4,084,238

[45] Apr. 11, 1978

[54] ELECTRONIC CASH REGISTER WITH IMPROVED DISPLAY UNIT

[75] Inventor: Tetsuya Masuo, Shizuoka, Japan

[73] Assignee: Tokyo Electric Co., Ltd., Tokyo, Japan

[21] Appl. No.: 740,043

[22] Filed: Nov. 8, 1976

[30] Foreign Application Priority Data

Nov. 12, 1975 Japan ............................. 50-135943
Nov. 14, 1975 Japan ............................. 50-137012

[51] Int. Cl.² .......................................... G06F 15/20
[52] U.S. Cl. .......................... 364/405; 364/900
[58] Field of Search ............... 235/152, 156, 168, 23; 340/324 R; 364/900

[56] References Cited

U.S. PATENT DOCUMENTS

| | | | |
|---|---|---|---|
| 3,056,547 | 10/1962 | Becker | 235/23 X |
| 3,564,503 | 2/1971 | KikuoKubo et al. | 364/900 |
| 3,762,637 | 10/1973 | Hernandez | 235/156 |
| 3,946,220 | 3/1976 | Brobeck et al. | 235/168 |

*Primary Examiner*—David H. Malzahn
*Attorney, Agent, or Firm*—Flynn & Frishauf

[57] ABSTRACT

In an electronic cash register comprising a keyboard including a plurality of entry keys and a decimal point key, and a display unit including an amount display section and a repeat display section, there is provided a control circuit for setting digits on the amount display section which correspond to the operated entry keys under normal operation. After the operation of the decimal point key the digits corresponding to the operated entry keys are displayed on the repeat display section.

3 Claims, 9 Drawing Figures

ELECTRONIC CASH REGISTER WITH IMPROVED DISPLAY UNIT

This invention relates to an electronic cash register having an improved display unit.

Where, in the prior art electronic cash register, it is desired to display decimals it is usual to provide a floating decimal point for a money amount display section of the display unit which can be lighted, extinguished or moved so as to display the integral part of a decimal on the lefthand side of the floating decimal point and the fractional part on the righthand side. Such electronic cash register, however, requires a special circuit for displaying the decimal point, thus complicating the drive circuit for the display unit.

In an electronic cash register, the display of the decimal point is necessary only for limited display operations such as percent rate display or the like so that the frequency of using the decimal point is low. For this reason, it is not desirable to make the drive circuit for the display unit complicated and expensive because of the presence of a decimal point which is not used frequently.

Accordingly, it is an object of this invention to provide an improved electronic cash register which is simple in construction and inexpensive but capable of displaying a decimal by utilizing the money amount display section and the repeat display section of the display unit.

SUMMARY OF THE INVENTION

According to this invention, there is provided an electronic cash register of the type comprising a keyboard including a plurality of entry keys and a decimal point key, a display unit including an amount display section having a plurality of digits, and a repeat display section for registering the number of merchandise items sold which belong to the same department and have the same price, and a display control circuit having a first means for setting on the amount display section digital data corresponding to the entry keys operated and a second means for detecting the operation of the decimal point key, wherein said second means, when having detected the the operation of the decimal point key, causes said first means to set on the repeat display section digital data corresponding to the entry keys operated.

BRIEF DESCRIPTION OF THE DRAWINGS

This invention can be more fully understood from the following detailed description when taken in conjunction with the accompanying drawings, in which.

DETAILED DESCRIPTION

Figures 1, 3:
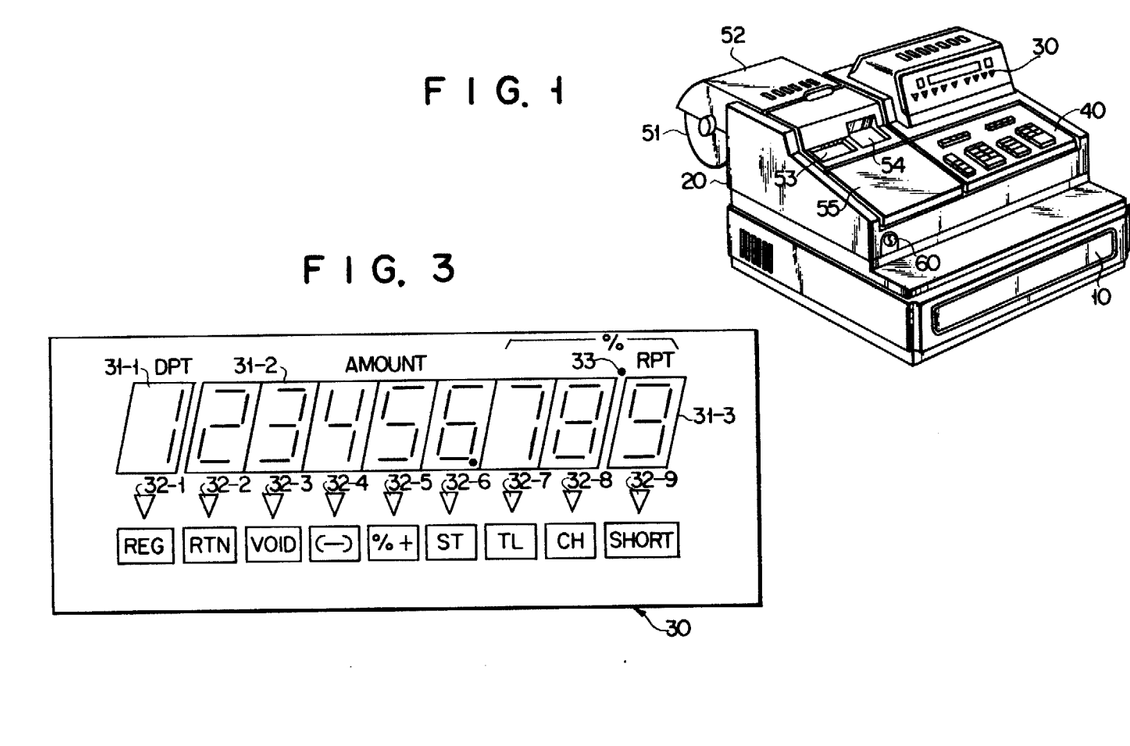
FIG. 1 is a perspective view showing an electronic cash register according to one embodiment of this invention.
FIG. 3 is a front view of the display unit of the electronic cash register shown in FIG. 1.

A preferred embodiment of the electronic cash register of this invention comprises a casing 20 containing a drawer 10, electronic circuit components to be described later and a printing mechanism, not shown. On the casing 20 are mounted a display unit 30 and a keyboard 40, and adjacent to the display unit 30 is secured a roll holder 52 for supporting a roll 51 of receipt sheet and journal paper. There are also provided an exit port 53 for the printed receipt sheets, a window 54 for viewing the content recorded on the journal paper and a memo paper holder 55 which is formed of a stainless steel sheet for holding memo papers by, for example, a piece of parmanent magnet.

Figure 2:
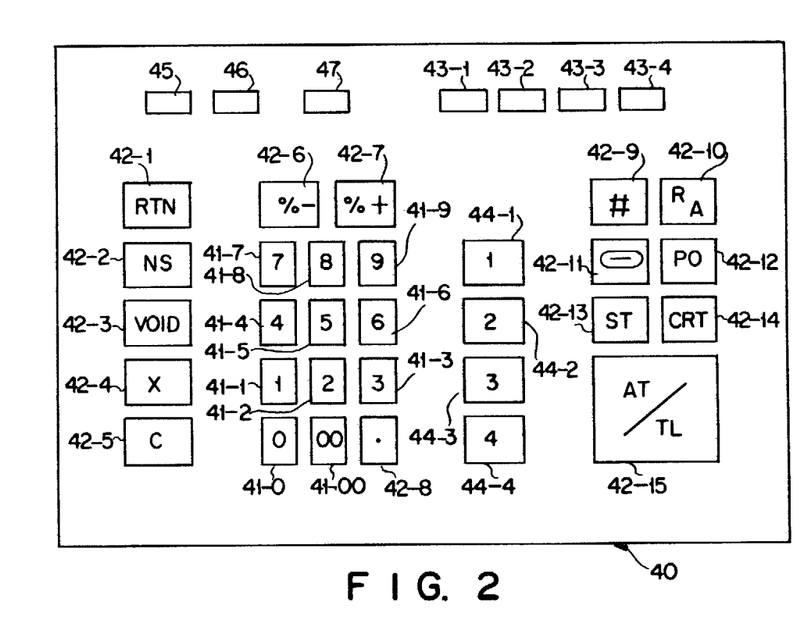
FIG. 2 is a top plan view of the keyboard utilized in the electronic cash register shown in FIG. 1.

As shown in FIG. 2, the keyboard 40 is provided with numeral keys or entry keys 41-00, 41-0 through 41-9 for making entries of the amounts of money of merchandises; function keys 42-1 through 42-15 for performing various functions of the cash register including, addition, subtraction, multiplication, division and other operations; clerk keys 43-1 through 43-4; department keys 44-1 through 44-4; a receipt sheet feed key 45 for feeding receipt sheets independently of the printing operation; a journal paper feed key 46 for feeding the journal papers independently of the printing operation; and a date/register number key 47 for setting dates and the register number. Function keys 42-1 through 42-15 respectively represent a merchandise return key; a no sale key; a void key; a multiplication key; a clear key; a percentage minus key; a percentage plus key; a decimal point key; a number key; a received on acount key; a minus key; a paid out key; a sub-total key; a credit sales total key, and an amount tender and cash sales total key.

In the electronic cash register shown in FIG. 1, a main key switch 60 on the fore side of the casing 20 is constructed to be rotated by a key inserted in the key opening thereof for providing "registration, " "inspection" and "clear" command signals to a central processing unit thus performing registration, inspection and clear operation according to the angle of rotation of the key. The term "registration" is used herein to mean a series of operations of storing the amounts of money of the merchandise items in a memory device of the cash register, calculating the total of the amounts, printing the total on a receipt sheet and journal paper and displaying it on the display unit. The term "inspection" is used to mean such operations as printing the total sum of the amounts of the sales sequentially stored in the memory device and the total number of the merchandise items sold, while the term "clear" means such operations as printing the total sum of the amounts of money and the number of merchandise items sequentially stored in the memory device by the "registration" operations at the end of one day and clearing the content of the memory device.

As shown in FIG. 3, the display unit 30 comprises a department display section 31-1 comprising a single digit display portion, an amount display section comprising seven digit display portions, and a repeat display section 31-3 comprising a single digit display portion. A point located at the third digit display portion is used to separate the dollar unit from the cent unit. Beneath the display sections 31-1, 31-2, and 31-3 are juxtaposed a plurality of light emitting display elements 32-1 through 32-9 respectively indicating pannels having the contents of the operations of "registration," "return of merchandise," "correction," "discount or percentage minus," "percentage plus," "sub-total," "total," "change" and "shortage." A decimal point mark 33 is provided between the amount display section 31-2 and the repeat display section 31-3 for the purpose of displaying a decimal point.

Figure 4:
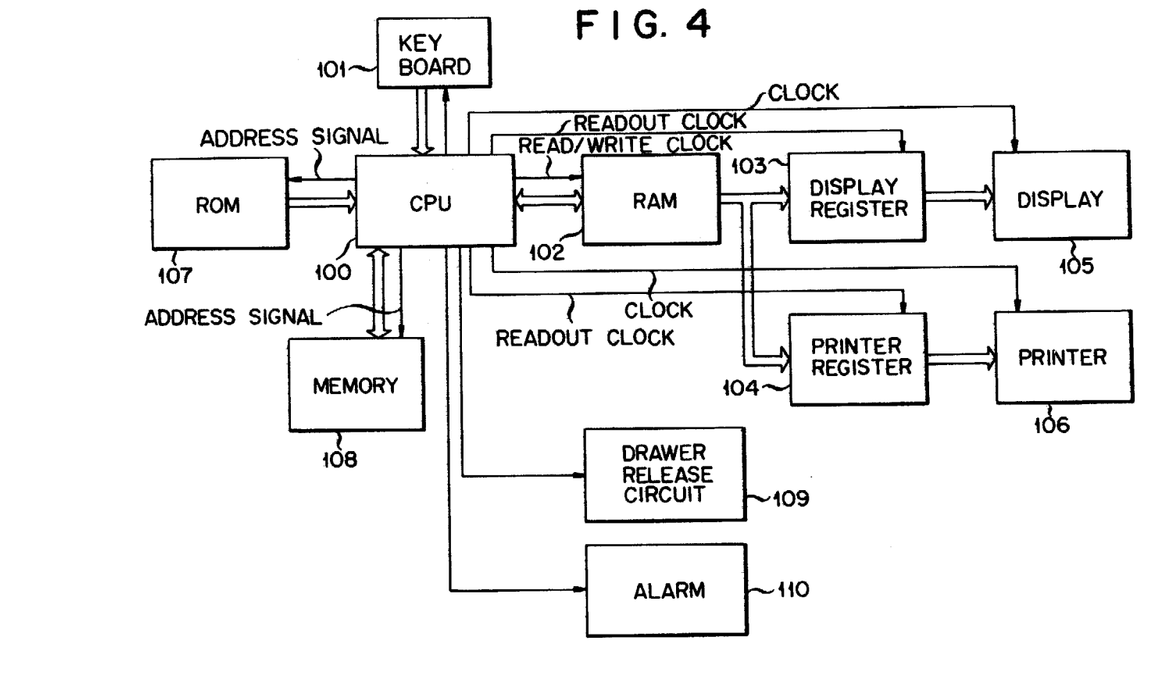
FIG. 4 is a block diagram showing an electric circuit utilized in the electronic cash register shown in FIG. 1.
Figure 5:
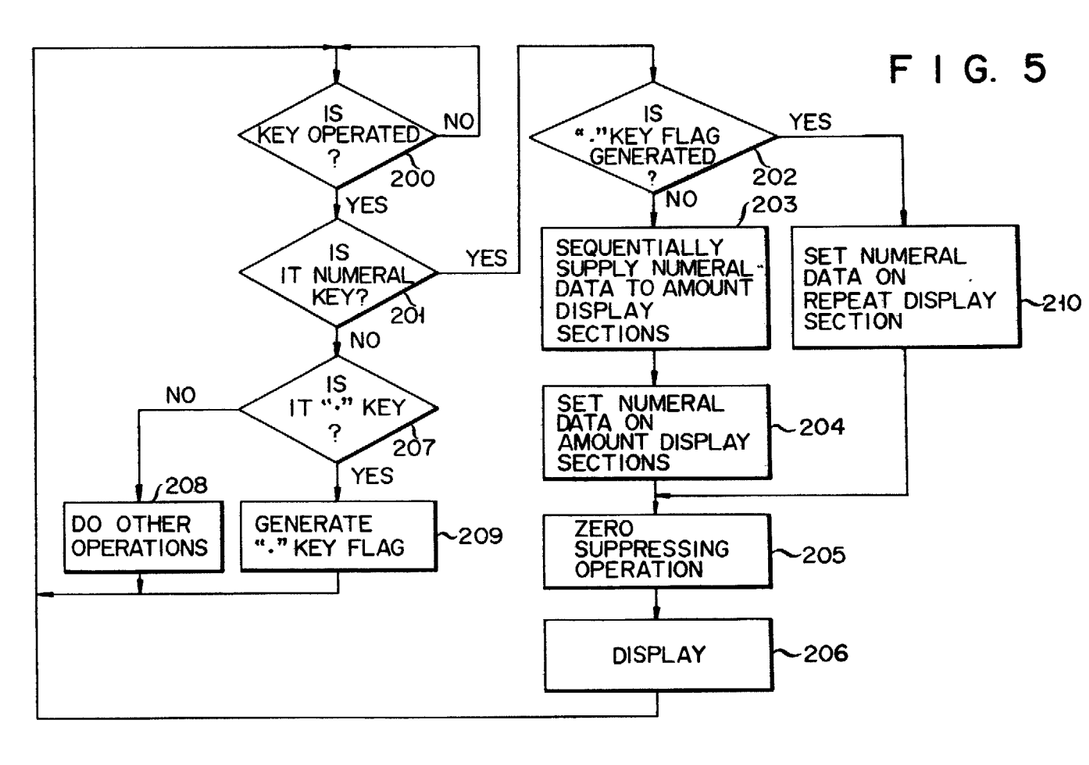
FIG. 5 is a flow chart for explaining the operation of the electronic cash register shown in FIG. 1.

During the normal operation of the cash register, the display unit 30 is controlled to display the amount of the money of the merchandise items sold on the amount display section 31-2 according to the entry key operation and to display the number of the merchandise items sold on the repeat display section 31-3 according to the department key operation. On the other hand, where a percent rate operation is performed, the display unit 30 is controlled to display the integral part of the value of the percentage on the amount display section 31-2 and the fractional part on the repeat display section 31-3 by the operation of the entry keys and decimal point key 42-8. Since the construction of the circuit shown in FIG. 4 utilized to operate the electronic cash register is analogous to the prior art circuit its construction and operation will be described briefly. In this circuit, a central processing unit (CPU) 100 sends a sales acount information to a random access memory (RAM) 102 corresponding to a key information from a keyboard 101. The information stored in the random access memory 102 is sent to a display register 103 and a printer register 104 in response to a readout command signal from the CPU 100. In response to a clock signal from the CPU 100 to display register 103 operates to successively shift the content thereof digit after digit so as to energize the segments of respective digits of the display unit 105 as will be described later more in detail. The respective display digit portions of the display unit are sequentially energized by the clock signal from the CPU 100. In the same manner, the printer register 104 sends its content successively to a printer 106 in accordance with the clock signal from the CPU 100 to print numeral information. A read only memory 107 stores program information (including a program as shown in FIG. 5, for example) and supplies to the central processing unit 100 program information corresponding to an address designation signal generated by the CPU 100 in response to key information from the keyboard 101. Further, a memory device 108 is provided to store information showing that a decimal point key on the keybaord 101 has been operated and to successively store information regarding the registered amount of money. A drawer release circuit 109 is energized by a signal supplied from the CPU 100 when a predetermined information is generated by the keyboard 101 for opening the drawer 109. An alarm device 110 is energized by a signal supplied from the central processing unit when keys are operated inadvertently.

The operation of the electronic cash register shown in FIG. 1 will now be descirbed with reference to the flow chart shown in FIG. 5.

In the normal registration operation of the sales amount, some of the numeral or entry keys 41-00 and 41-0 through 41-9 are operated. In this case, at a stage 201 of the flow chart shown in FIG. 5, the operations of the keys are confirmed. When the operated key is a numeral or entry key the program is advanced from stage 201 to stage 202. In this example, since the decimal point key is not operated the program is advanced to stage 203. This stage 203 is accomplished by reading the numeral information which has been stored in the display register 103 shown in FIG. 4 in accordance with readout clock signal supplied from the CPU 100. Then, the readout numeral data is set in the amount display section 31-2 of the display unit 30 (FIG. 3) in the state 204. In order to prevent a zero (not required to be displayed) from being displayed on the amount display section 31-2, the zero display signal is interrupted from the display section 31-2 by a zero suppression operation performed at stage 205.

Then, at stage 206 a value corresponding to the operated numeral or entry key is displayed on the amount display section 31-2. When any one of the department keys 44-1 through 44-4 is operated, the program is advanced to stage 208 from stage 200 via stages 201 and 207. At stage 208 a value corresponding to an operated department key is displayed on the department display section 31-1 (FIG. 3). Where the electronic cash register is designed such that the repeat operation is possible by the department key the number of repeats can be displayed on the repeat display section 31-3 by repeatedly operating the same department key. In this manner, concurrently with the display of the amount and department, the display element or lamp 32-1 is lighted, thus effecting the registration of the sales account.

A % rate operation will now be described. At first, some of the numeral or entry keys are operated to display the amount of money on the amount display section 31-2. Then, when the decimal point key 42-8 is operated the program is advanced from step 207 to step 209 of the flow chart shown in FIG. 5 and a decimal point key flag or "." key flag is generated in the memory element of the memory device 108 (FIG. 4). Thereafter, when an entry key is operated again, since the CPU 100 detects that the memory element of the memory device 108 generates a "." key flag, the program is advanced to stage 210 from stage 201 via stage 202 whereby a value corresponding to the operated entry key is displayed on the repeat display section 31-3. Then, the percentage minus key 42-6 or the percentage plus key 42-7 is operated so as to display the integral part on the amount display section 31-2 and the fractional part on the repeat display section 31-3, and the display element 32-4 or 32-5 is lighted, thus effecting the percentage rate operation.

Figure 6:
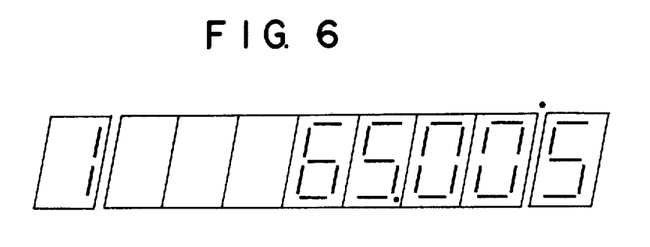
FIGS. 6 and 7 are diagrams showing a portion of the display unit shown in FIG. 3 for explaining the difference in the display modes at the time of registration and percent rate operations, respectively.
Figure 7:
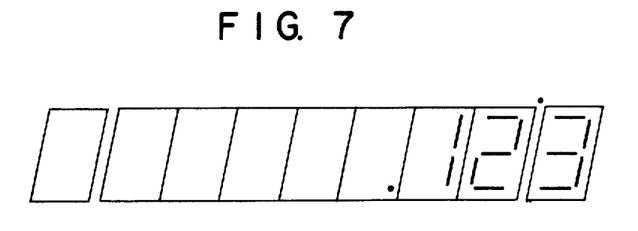

Consider now a case wherein five merchandise items each of which costs 65 dollars and belongs to a first department are sold and such sale is to be registered. Then, numeral or entry keys 41-6, 41-5 and 41-00 are operated to display an amount of 6500 dollars on the amount display section 31-2. Then, the department key 44-5 is operated five times to display numeral 1 on the department display section 31-1 and numeral 5 on the repeat display section 31-3. As a result, numerals "1," "6500" and "5" are respective displayed on respective display sections 31-1, 31-2 and 31-3 respectively as shown in FIG. 6.

To perform a −12.3% rate operation, numeral or entry keys 41-1 and 41-2 are operated to display numeral 12 on the amount display section 31-2 and then the "." key or the decimal point key 42-8 is operated and the numeral or entry key 41-3 and the percentage minus key 42-11 are operated sequencially thus displaying numerals "12" and "3" on the amount display section 31-2 and the repeat display section 31-3, respectively.

Figure 8:
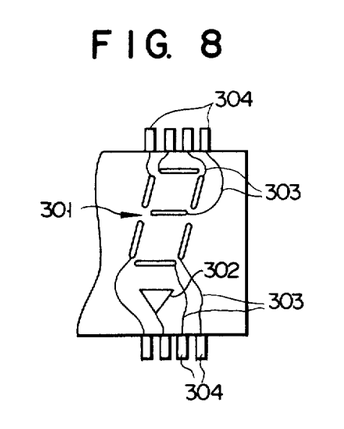
FIG. 8 is a simplified diagram showing the digit display section and the function display section of the display unit shown in FIG. 3.

In the prior art cash register, the display sections 31-1 through 31-3 and display lamps 32-1 through 32-9 are energized independently so that it has been necessary to provide independent drive circuits for these display sections. According to this invention, however, it is possible to selectively energize these display elements 32-1 through 32-9 by a single drive circuit which is arranged in the same position as drive circuits for display sections 31-1 through 31-3. More particularly, as shown in FIG. 8, each of the display sections 31-1 through 31-3 is constituted by 7 segments 301 arranged in the form of a FIG. 8 whereas each of the display elements or lamps 32-1 through 32-9 is comprised by a trianglar segment 302 disposed beneath the segments 301. Respective segments are connected to terminals 304 via lead wires 303.

Figure 9:
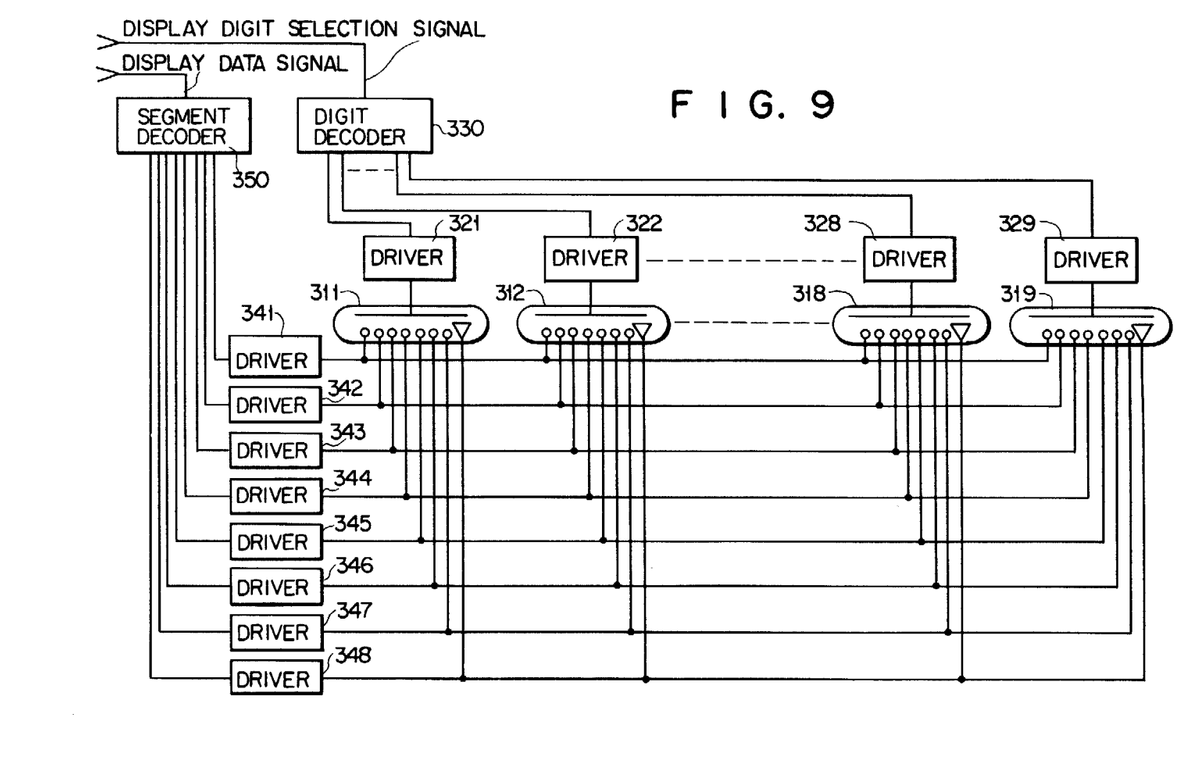
FIG. 9 is a block diagram showing display sections and an operation circuit for selectively operating the display sections.

FIG. 9 shows a drive control circuit for display sections 311 through 319 wherein display section 311 corresponds to the department display section 31-1 shown in FIG. 3, display sections 312 through 318 to the amount display section 31-2 and the display section 319 to the repeat display section 31-3, respectively. Each of the display sections 311 through 319 comprises 7 segments for displaying digits, a triangular display segment and a common anode electrode opposing these segments. The anode electrodes of respective display sections 311 through 319 are coupled to a display digit decoder 330 via drive circuits 321 through 329 respectively, whereas the digit display segments and the triangular display segments are coupled to a segment decoder 350 respectively through drive circuits 342 through 348.

The display digit decoder 330 is connected to receive as a display digit selection signal a clock signal from the central processing unit 100 to selectively energize one of the drive circuits 321 through 329 so as to energize one of the anode electrodes of the display sections 311 through 319, thus selecting a corresponding display digit portion. The segment decoder 350 is connected to receive a display data signal from the display register 103 shown in FIG. 4 for selectively enertgizing some of the drive circuits 341 through 348, thus energizing selected ones of digit display segments and triangular display segments of the display sections 311 through 319.

Let us now consider a case wherein 5 merchandise items each having a unit price of 65 dollars and belonging to the first department were sold and it is desired to display the sales as shown in FIG. 6 during the registration operation of the sales account. At first, two of the drive circuits 341 through 347 and the drive circuit 348 are energized by a signal from the segment decoder 350 thus energizing digit display segments corresponding to digit "1" and a triangular segment. At the same time, drive circuit 321 is also energized by a signal from the display digit decoder 330 to energize the anode electrode of the display section 311. Consequently, only digit "1" and the triangular segment (in FIG. 3, segment 32-1) representing the registration of the display section 311 are energized. Then, the drive circuit 322 is energized to energize the anode electrode of the display section 312. However, as drive circuits 341 through 348 are not energized, no display is made by the display section 321. In this manner, drive circuits 321 through 329 are sequentially energized to display digits "6," "5," "0," "0" and "5" respectively on display sections 315 through 319. Then, the drive circuit 321 is energized again to display digit "1" on the display section 311.

The display digit selection operation is performed cyclically at a high speed for the display sections 311 through 319 and the segment energization is performed in synchronism with the display digit selection operation so that the display sections 311 through 319 are seen as if they simultaneously display repective digits.

The embodiment described above makes it possible to display the content of the processing by providing a triangular display element for displaying the content of the processing for each one of the department display section, amount display sections and the repeat display section and by providing a single drive circuit 348 for these triangular display elements.

Although the invention has been shown and described in terms of a specific embodiment thereof, it should be understood that the invention is by no means limited to this embodiment. For example, in the display unit shown in FIG. 3, although a one digit repeat display section 31-3 is illustrated, it is also possible to provide a two digit repeat display section and to dispose a triangular segment beneath the digit segments comprising one digit for displaying an alarm.

What is claimed is:

1. An electronic cash register comprising:

keyboard means including a plurality of entry keys, a plurality of function keys, a plurality of department keys, and a decimal point key, said entry keys, function keys and department keys being selectively operable to register data relating to merchandise items sold;

a data processing unit including storing means and connected to said keyboard means for permitting said storing means to store variable transaction data in response to the operation of said keyboard means; and a display unit coupled to said data processing unit and including an amount display section having a plurality of digits and a repeat display section having at least one digit, said data processing unit including means responsive to the operation of said entry keys to set on said amount display section digital data corresponding to the entry keys operated, responsive to the repetitive operations of the same one of said department keys to set on said repeat display section digital data corresponding to the number of operations of said same department key, responsive to the operation of said decimal point key to generate a flag in said storing means and responsive to the operation of the entry keys operated subsequent to the operation of said decimal point key to set on said repeat display section digital data corresponding to the entry keys operated while said flag is being generated in said storing means.

2. An electronic cash register according to claim 1, wherein:

said display unit further includes a plurality of light emitting display elements arranged in one-to-one correspondence with the digit portions of said amount display section and repeat display section and a plurality of indicators representing different operation modes and respectively combined with said light emitting display elements to indicate the respective operation modes; and said data processing unit includes means responsive to the operation of said function key to energize one of said light emitting display elements to display the operation mode which corresponds to the function key operated.

3. An electronic cash register according to claim 2, in which each of the digit portions of said amount display section and repeat display section has seven segments arranged in the shape of "8," and said light emitting element is electrically connected as an eighth segment of said digit portion, and groups each including said seven segments of each digit portion and the corresponding one of said light emitting elements are sequentially controlled by said data processing unit.

* * * * *